Nov. 30, 1943. J. F. MEDUNA Re. 22,397

APPLICATION OF SPRAY METAL TO METAL SURFACES

Original Filed Aug. 6, 1942

INVENTOR.

John Frank Meduna

BY

Louis Burgess

Att'y

Reissued Nov. 30, 1943 Re. 22,397

UNITED STATES PATENT OFFICE 22,397

APPLICATION OF SPRAY METAL TO METAL SURFACES

John Frank Meduna, Seattle, Wash., assignor to Metallizing Engineering Co., Inc., Long Island City, N. Y., a corporation of New Jersey Original No. 2,320,327, dated May 25, 1943, Serial No. 453,903, August 6, 1942. Application for reissue August 14, 1943, Serial No. 498,608

11 Claims. (Cl. 117—50)

This invention relates to new and useful improvements in the application of spray metal to metal surfaces.

In industrial practice, a coating of metal is frequently applied to a base of the same or other metal by spraying. For this purpose, the metal to be applied is projected against the surface to be covered in the form of a spray, the particles of which are in a molten or heat plastic condition. As a rule, metal spraying is carried out with the use of metal spray guns, i. e., devices in which the metal is fed to a heating zone from which zone metal particles, at least some of which are molten or in a heat plastic condition, are propelled against the surface to be sprayed, by a blast of air or other gas. The application of spray metal may, for example, be carried out to protect the base against corrosion, to provide a surface of the desired ornamental or bearing characteristics, or to build up worn machine parts.

In making spray metal coatings, particularly in the formation or re-building of bearings or other working surfaces of machine parts, it is essential that the applied spray metal adheres to the surface to which it is applied with a high degree of bond, for, otherwise the applied spray metal will come off. For the purpose of securing the requisite degree of bonding, the surface to which the spray metal is to be applied is as a rule suitably pre-conditioned. In the past, such preconditioning treatment has been generally of two kinds. Mechanical roughening and heating.

Mechanical roughening of a metal surface to adapt the same to receive and retain applied spray metal must be of a type involving the formation of a multiple number of closely spaced cavities with peened and splayed edges and interspaces, forming a multitude of keyways. In the past the most common method of procuring such type surface has been by sand or grit blasting. Sand or grit blasting, however, is in many cases unsatisfactory and will often not yield a surface capable of bonding applied spray metal with a satisfactory degree of bond. This is particularly true in the application of heavier spray metal coatings on substantially flat surfaces and in the application of spray metal to surfaces forming an inside diameter. Spray metal has a tendency to shrink and in these cases the sand or grit blasted surface does not provide a sufficient bonding surface to prevent the separation of the applied spray metal coating from the base. For this reason, for instance, it has never been practical to apply spray metal coatings to hardened engine valve seats or similar objects which require an especially strong bond between the spray metal coating and the base. Furthermore, many objects and particularly machine tools or parts such as, for instance, generator shafts or the like, are inherently unsuitable for sand or grit blasting.

An alternative form of mechanical surface roughening for spray metal bonding purposes is that of machine roughening the surface to be sprayed in a particular manner designed to procure the above mentioned surface characteristics essential for spray metal bonding. This surface roughening method, however, is subject to the same inherent limitations and drawbacks as the one involving sand or grit blasting.

The heating method of surface conditioning a metallic base to bond thereto applied spray metal involves the heating of the surface to a relatively high temperature and to spray the hot surface with metal. This method is not widely used and requires, as a general rule, considerable skill and elaborate equipment and is relatively expensive. Furthermore, in most cases the temperature to which the surface or base must be heated is so high that it tends to warp or otherwise destroy the articles to which the metal spray is to be applied.

There is one basic limitation inherent in practically all of the hitherto used conditioning methods for rendering metal surfaces capable of satisfactorily bonding applied spray metal. This limitation resides in the fact that the methods are not adaptable to hardened metal articles or surfaces. Many hardened articles or surfaces cannot be properly surface-conditioned by mechanical roughening procedures such as grit or sand blasting, or, rough machining. On the other hand, the heating method is not feasible, for most such metal articles or surfaces will soften and thus lose their hardness if they are heated to the temperature necessary to secure the desired degree of bonding to the spray metal applied thereto. Though partly hardened articles have been prepared by grit or sand blasting, using very hard grit, such as aluminum oxide abrasives, nevertheless, the bond obtained is usually unsatisfactory.

One object of the invention comprises, inter alia, a method substantially free from the limitations hereinabove set forth. A further object of the invention comprises a novel conditioning procedure that may be applied as a rule to any metal base or surface regardless of its hardness or geometric configuration. Another object of the invention comprises a process for so conditioning a metal surface that the same is, as a rule, capable of bonding thereto applied spray metal to a higher degree than is normally procurable with hitherto known practices.

These and still further objects of the invention will be seen from the following description.

In accordance with the invention, a metal surface to which spray metal is to be applied with a high degree of bond is conditioned for the spraying step by step by establishing contact between such metal surface and a metal electrode, electrically heating the contacting surfaces of the electrode and the metal surface by means of an electric current flowing, under conditions of resistance heating, through said contacting surfaces to firmly bond electrode material to said metal surface, and causing small amounts of electrode material to be left deposited on the metal surface.

The metal electrode that I may use in accordance with the invention is preferably of the wire type, i. e., of the type in which a wire or bar, whether "round," "flat," or of any other shape, constitutes an electrode. For best results I have found that a nickel wire electrode gives satisfactory results. A ⅛" commercial nickel wire constitutes a satisfactory wire electrode. It is understood that electrode size and electric current should be suitably coordinated.

Contact between the metal electrode and the metal surface to be conditioned for the metal spraying operation is established in the ordinary manner by placing the electrode in direct contact with such surface. Within the range of normal requirements, practically any metal surface and any metal electrode may be used. In case, however, any particular electrode metal should prove unsuitable or unsatisfactory in the application of my method to a given metal of a base surface to be conditioned for spraying, the operator can determine by a few simple empirical tests as to which electrode metal to select for best results. As a practical matter any two metals that can be joined by heating will operate as electrode material and surface to be conditioned for spraying.

The electric heating of the contacting surfaces of the metal electrode and metal surface, to be conditioned for spraying, may be effected by placing the electrode and the metal surface in electric circuit with a source of electrical energy in such manner that the circuit is closed by contact between the metal surface and the metal electrode. The conditions of current flow in the circuit upon so closing the same are so adjusted that conditions of resistance heating at the contacting surfaces of electrode and metal surface exist. By conditions of resistance heating I mean that the current flowing through the contacting surfaces is in amount and intensity sufficient to cause heating at the contacting surfaces by the resistance offered the free flow of the current by reason of the joint constituted by the contacting surfaces.

Though voltages having a wide range, including relatively high voltages of the order of magnitude of one hundred to two hundred volts, may be used in accordance with the invention, I prefer to use voltages of a lower order of magnitude. One of the reasons for the preference for a lower voltage range is that higher voltages have a tendency to arc badly particularly when making and breaking contact between the electrode and the metal surface, whether the making and breaking be deliberately induced or caused by the unevenness of the surface treated. Though relatively mild arcing may be beneficial in the procurement of a satisfactorily conditioned surface, excessive arcing is, under normal conditions, an undesirable aspect, impairing satisfactory deposit of electrode material in accordance with the invention. Considerable amounts of metal may be lost as the result of the high temperatures caused by the arc thereby tending to render the procedure less efficient. Furthermore, such arcing is attended by operational difficulties which would often require a greater skill on the part of the operator and or suitable control mechanism. A still further disadvantage of excessive arcing is the formation of metal oxide which may tend to impair the bond in certain cases between the conditioned surface and thereto applied spray metal. I prefer therefore to so adjust the conditions of current flow in the circuit that, upon closing or breaking the same, the current intensity is sufficiently low to avoid excessive arcing and yet have the current in amount and intensity sufficient to cause the desired deposition and bonding of electrode material.

While very low voltages such as even fractions of one volt can be used and give, when applied with care, fairly satisfactory results, such low voltages are as a rule not desirable for larger-scale efficient operations as they require the use of relatively small or at least fairly sharp pointed electrodes so that the procedure is slow. In general, a satisfactory current will depend upon the voltage, the size of the electrodes, and principally upon the amount of contact between the electrode and the metal surface of the base to be sprayed. These factors may be easily adjusted to suit particular conditions. I have found that an average voltage from one-half to twenty volts gives satisfactory results. For best results, however, I find that ordinarily a voltage range of from two to nine volts is to be preferred in the majority of cases. The amount of current to be used may vary over a wide range depending upon the factors hereinabove recited. As a general rule, however, when using wire electrodes I prefer a current in excess of two hundred amperes and most preferably a current of the order of magnitude of about three hundred to four hundred amperes. Thus, for instance a three hundred ampere current gives good results with a ⅛ inch nickel wire electrode. When using larger electrodes the use of larger amounts of current may be necessary.

The deposition of small amounts of electrode material within the procedure in accordance with my invention may be caused either by the melting off of small amounts of electrode material from the tip of the electrode or by pulling off small amounts of surface bonded electrode material from the tip of the electrode when moving the latter. In the majority of cases, deposition of electrode material may be caused in both of these manners. Moving of the electrode will as a rule accomplish the desired deposition of small amounts of electrode material firmly bonded to the surface area to which electrode contact was applied.

Within the preferred embodiment of my invention, the metal surface to be conditioned for spray metal application when inserted in circuit, as above set forth, with a suitable metal electrode and a suitable source of electric energy is repetitiously contacted and preferably repetitiously contact stroked with the electrode on successive areas, the stroking action depositing on these areas small amounts of electrode material firmly bonded thereto. Alternatively the electrode may be applied with a stipling action to the metal surface. While these procedures essentially involve breaking and making contact between the metal surface and the electrode, it is also possible and sometimes advisable to move the electrode relative to the base while maintaining resistant-heating contact therebetween. When proceeding in this manner electrode material is deposited along the path of movement of the electrode relative to the metal base. On the other hand, in the making and breaking contact method small amounts of individual electrode material are deposited upon the metal base. The procedure is continued or repeated in either case until the surface to be sprayed is satisfactorily covered with electrode material. Care should be taken that the electrode is not left in a contact position too long at any one point or area as this may cause the permanent attachment of the electrode to the base and thus render its further movement and further deposit of electrode material impossible.

I have found that it is not necessary to have every spot on the metal base covered by the deposited material, but that on the contrary it is sufficient to deposit a large number of small, closely spaced, amounts of electrode metal with spaces in between some of them. The size of the spaces between deposited electrode material particles may be varied over a reasonably wide range at the judgment of the operator. Broadly stated, the smaller the spaces the stronger a bond will result and, therefore, where a strong bond is not desired the particles may be quite widely spaced. For a strong bond, however, I prefer to have spaces between particles not appreciably in excess of $\frac{1}{32}''$.

When proceeding in accordance with the invention, the size and spacing of the projections and craters on the surface of the electrode deposited metal are, as a rule, substantially of the same order of magnitude as the size of spray metal particles in the spray metal layer. When making at least some of the electrode metal deposits relatively large, aided, if necessary, by increases in amperage, the resulting irregular patterned surface of the hereindescribed type and characteristics will include larger size projections normally of an order of magnitude in excess of that of spray metal particles. These larger type projections of higher order of magnitude, though not necessarily acting as interlocks with spray metal particles of the subsequently superimposed layer of spray metal, nevertheless, contribute to the bond by counteracting or preventing slippage of the spray metal layer with respect to the base surface resulting from the shrinkage of the applied spray metal.

The amount of the electrode material deposited on the base as well as the size of the larger type irregular projections, if such are produced, may be varied to suit conditions or requirements. When a heavy spray metal coating is to be deposited, I prefer to make some of the larger type projections of deposited electrode metal relatively large. Some of these projections may thus, for instance, extend as much as $\frac{1}{16}''$ or even more. However, where a thin coating such as a $\frac{1}{32}''$ coating is to be applied by metal spraying, I prefer to keep the height of these larger type projections at less than the thickness of the spray metal coating to be applied, i. e., less than $\frac{1}{32}''$, as otherwise, if the sprayed metal coating is machined smooth, these projections will extend through the coating to the machined surface. There are, however, some applications where this is no disadvantage.

I find it sometimes advantageous to make the larger type projections, if such are desired, relatively so high that they will extend to beyond the thickness of the coating of sprayed metal that is to be applied, and then, machine off or tool off their tops so that they will not project through the spray metal coating to be applied. Thereafter, the spray metal coat may be applied.

If desired, small amounts of electrode metal may be deposited, as described previously, to the base and then the process continued so that more electrode material is deposited on top of electrode material previously deposited, as well as in the spaces between previously deposited electrode metal. By this continued application of electrode material, a relatively thick coating of electrode material may be applied. Within normal requirements, the thickness of the coating of electrode material has, in itself ordinarily no effect upon the bond obtained, nor upon the satisfactory operation of the method.

Amounts of electrode metal may be deposited upon the metal base in accordance with my invention, in any one of a number of patterns. For instance, the metal may be deposited, although in small successive amounts, in strips or ridges, or it may be deposited in separate isolated spots, or in criss-cross pattern.

The following examples are furnished by way of illustration and not of limitation:

*Example I*

A source of electric energy consisting of a transformer connected to an alternating current power supply is first provided, capable of an average voltage between two and nine volts and approximately three hundred amperes. One lead from the source of electric energy is connected to a 2 x 3 x $\frac{1}{4}''$ steel plate top surface of which is to be conditioned for metal spraying and has been suitably cleaned such as by application of $CCl_4$ to remove grease and dirt, and the other lead from the source of electrical energy is connected to a nickel wire of approximately $\frac{1}{8}''$ diameter. The nickel wire is first contacted with the top surface of the steel plate and as soon as the metal of the electrode starts to melt the contacted surface is lightly and continuously stroked with the nickel wire over successive areas of the same whereby the end of the nickel wire is caused to make and break contact repetitiously with successive portions of the surface. After the desired surface area has been substantially covered by relatively closely spaced stroke marks of deposited nickel from the nickel wire electrode, the treatment is discontinued and the surface is now ready to be sprayed upon.

*Example II*

A source of electrical energy consisting of a direct current generator is first provided, capable of producing a voltage of 5 volts and approximately 400 amperes. One lead from the source of electrical energy is connected to a bronze sleeve, the previously cleaned outside surface of which is to be conditioned for metal spraying; the other lead from the source of electrical energy is connected to a stainless steel strip of flat wire approximately $\frac{1}{16}''$ thick by $\frac{1}{4}''$ wide. The stainless steel strip is first contacted with the surface of the bronze sleeve preferably on the edge of the strip, and as soon as the metal of the strip electrode starts to melt the contacted surface is lightly and intermittently stroked with the stainless steel strip over successive areas of the same, whereby the end of the stainless steel strip is caused to make and break contact repetitiously with successive portions of the surface. After the desired surface of the sleeve has been substantially covered by a large number of relatively closely spaced amounts of deposited stainless steel from the strip electrode, the treatment is discontinued and the surface is now ready to be sprayed upon.

As before pointed out, any common metal may be used as electrode metal on practically any base. Thus, for instance, such metals or alloys as steel, copper, bronze, zinc, silver, Monel, aluminum, cast iron, stainless steel, Inconel, or the like may be used either as electrode metal or as a base upon which the electrode metal is to be deposited. In most cases, however, I prefer for best results nickel, bronze, or silver as electrode metals, and among these, nickel as the most satisfactory material.

When using within the preferred embodiment of the invention a wire electrode, I prefer to use wires, whether round or flat shaped, having a maximum cross-sectional width substantially from $\frac{1}{16}''$ to $\frac{1}{4}''$.

The source of electrical energy useful in accordance with my invention may be one providing either an alternating or direct current.

The surface characteristics of electrode deposited metal in accordance with the invention may be seen from the following drawings comprising reproductions of photomicrographs:

Figure 1:
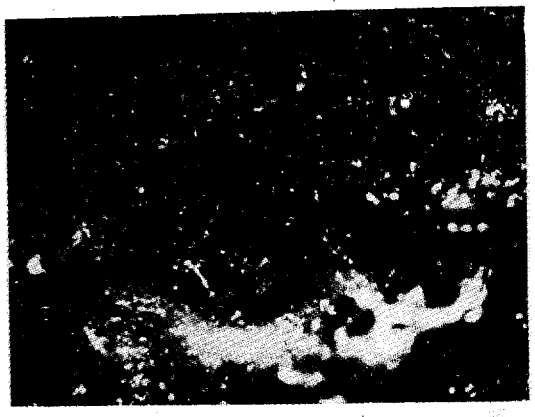
Fig. 1 illustrates a photomicrographic top view of a steel base treated in accordance with the invention.

The view illustrated in Fig. 1 is that of a photomicrograph, top view, unetched, with an oblique illumination. The magnification is 50X showing the craters and overhanging projections. The blurred structure high lighted in the foreground of Fig. 1 is one of the larger projections which being closer to the camera is somewhat out of focus.

Figure 2:
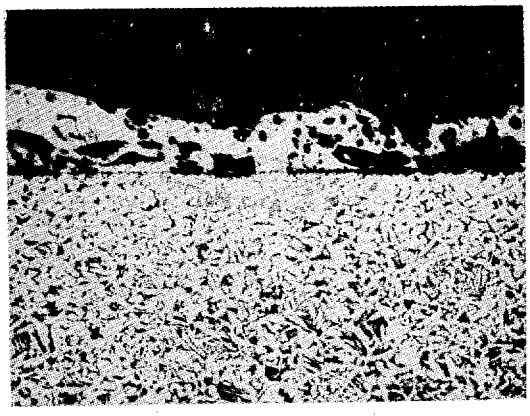
Fig. 2 illustrates a photomicrographic cross-section of the specimen shown in Fig. 1.

The photomicrograph illustrated by Fig. 2 represents a view perpendicular to the prepared surface at the edge of the specimen using a conventional picral etch and 100X magnification. The overhanging projections and craters with the overhanging edges and projections in the top layer of the electrode deposited metal are clearly shown. In the lower portion of Fig. 2 is the normal structure of the steel plate serving as a base; combined by fusion to this base is the electrode deposited nickel, having the appearance of solidified or frozen froth, foam or lava showing the projections and the many holes and pores, which at the upper surface of the nickel layer, constitute the craters with overhanging edges with which the thereafter to be applied spray metal can interlock.

Figure 3:
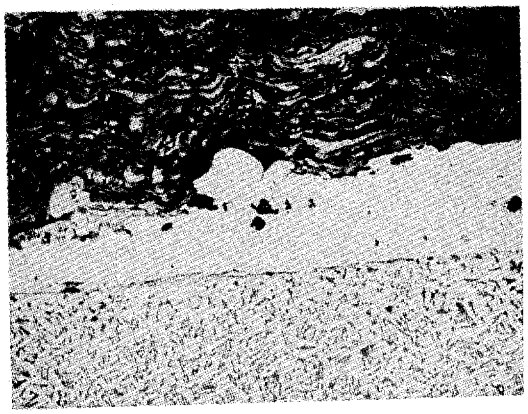
Fig. 3 is a photomicrographic cross-sectional cut through a steel base treated with nickel in accordance with the invention and having a superimposed spray metal coat.

The interlock between the electrode deposited metal and the thereon to be applied spray metal is typefied for instance by Fig. 3. The photomicrograph represented or illustrated by Fig. 3 represents a cross-sectional cut through a specimen obtained by spraying steel on a sample obtained by depositing nickel on a steel base by the electrode deposition method referred to. The cut was treated in the conventional manner with a picral etch. The photomicrograph illustrated by Fig. 3 represents a 100X magnification. The lower portion of Fig. 3 shows the normal structure of the mild steel base used. Bonded to this fusion is the intermediate fusion-deposited nickel layer of a characteristic frozen froth, foam or lava appearance. The top surface is that of the superimposed spray steel. The characteristic craters, projections and overhanging edges of the intermediate fusion-deposited nickel layer are clearly shown in typical interlock with particles of the spray metal layer.

Although the principle of the deposition of electrode material involves the use of heat produced by electric energy, the heat is produced at the relatively small surfaces of contact between the electrode and the base, and it is not necessary to heat up the whole base or base surface appreciably in the performance of this method. If the process is applied using large amounts of current continuously on a small piece of base metal, the base may heat up considerably. This may be controlled, however, by not using too much current on small base pieces or by allowing time to elapse between the application of the amounts of electrode material to the base, and also by applying cooling means, such as a blast of air to cool the surface either during or between application of electrode material.

I have found that the processes of preconditioning a metal surface for spray metal bonding as herewith described can be performed under water. While this would not generally be desirable for ordinary work, it may be of advantage under special circumstances or requirements. In this connection use of the process under water or even with the use of an aqueous medium as cooling agent may be used to prevent overheating in the application of the process.

Where non-oxidizing conditions are desirable, the process in accordance with the invention may be conducted in an inert atmosphere.

The procedure in accordance with my invention offers a further advantage in that it permits the preconditioning of a metal surface object or base, the surface of which consists of spray metal. In the past, spray metal surfaces, particularly when machined smooth, could not be properly conditioned for spraying. When speaking of a metal surface or metal base or where use is made of an expression of similar import, I mean to include a spray metal surface.

The foregoing specific description is for purposes of illustration and not of limitation and it is therefore my intention that the invention be limited only by the appended claims or their equivalents wherein I have endeavored to claim broadly all inherent novelty.

I claim:

1. In the method for applying spray metal to a metal surface with a high degree of bond, the improvement which comprises conditioning such metal surface for spray metal bonding by contacting multiple small individual areas of such metal surface with at least one metal electrode, including establishing contact between such metal surface and such metal electrode, electrically heating the contacting surfaces of said electrode and said metal surface by means of an electric current flowing, under conditions of resistance heating, through said contacting surfaces, to firmly bond fused electrode material to said metal surface, and causing small amounts of electrode material to be left deposited on said metal surface, to thereby obtain a surface characterized by an irregular roughness with a multitude of projections with overhanging edges and minute craters with overhanging edges, and thereafter spraying metal onto the metal surface thusly conditioned.

2. In the method for applying spray metal to a metal surface with a high degree of bond, the improvement which comprises conditioning such metal surface for spray metal bonding by a first operation involving establishing contact between such metal surface and a metal electrode, electrically heating the contacting surfaces of said electrode and said metal surface by means of an electric current flowing, under conditions of resistance heating, through said contacting surfaces to firmly bond fused electrode material to said metal surface, and causing small amounts of electrode material to be left deposited on said metal surface, and depositing additional small amounts of electrode material over successive areas of said metal surface by successively repeating said first operation over said areas, to thereby obtain a surface characterized by an irregular roughness with a multitude of projections with overhanging edges and minute craters with overhanging edges, and thereafter spraying metal onto the metal surface thusly conditioned.

3. In the method for applying spray metal to a metal surface with a high degree of bond, the improvement in accordance with claim 2 in which said electrode material is deposited upon said metal surface by relative movement between said electrode and said metal surface.

4. In the method for applying spray metal to a metal surface with a high degree of bond, the improvement which comprises conditioning such metal surface for spray metal bonding by a first operation involving establishing contact between such metal surface and a nickel wire electrode, electrically heating the contacting surfaces of said electrode and said metal surface by means of an electric current flowing, under conditions of resistance heating, through said contacting surfaces, to firmly bond fused nickel from said electrode to said metal surface, and moving said electrode relative to said metal surface leaving deposited thereon small amounts of nickel from said electrode, and depositing additional small amounts of nickel from said nickel wire electrode on successive areas of said metal surface by successively repeating said first operation over said areas, to thereby obtain a surface characterized by an irregular roughness with a multitude of projections with overhanging edges and minute craters with overhanging edges, and thereafter spraying metal onto the metal surface thusly conditioned.

5. In the method for applying spray metal to a metal surface with a high degree of bond, the improvement which comprises conditioning such metal surface for spray metal bonding by positioning such metal surface and a metal electrode in electric circuit with a source of electric energy so as to close said circuit by contact between said metal surface and said electrode, repetitiously contacting successive areas of such metal surface with said electrode, under conditions of current flow in said circuit sufficient to heat and firmly bond fused electrode material on said metal surface upon so closing said circuit to thereby deposit on said areas small amounts of electrode materials firmly bonded thereto, obtaining a surface characterized by an irregular roughness with a multitude of projections with overhanging edges and minute craters with overhanging edges, and thereafter spraying metal onto the metal surface thusly conditioned.

6. In the method for applying spray metal to a metal surface with a high degree of bond, the improvement in accordance with claim 5 in which said successive areas of said metal surface are repetitiously contacted with said electrode by stroking said surface with said electrode.

7. In the method for applying spray metal to a metal surface with a high degree of bond, the improvement which comprises conditioning such metal surface for spray metal bonding by positioning such metal surface and a nickel wire electrode in electric circuit with a source of electric energy so as to close said circuit by contact between said metal surface and said nickel wire electrode, repetitiously contact stroking successive areas of such metal surface with said nickel wire electrode under conditions of current flow in said circuit sufficient to heat and firmly bond fused nickel from said nickel wire electrode on said metal surface upon so closing said circuit, to thereby deposit on said areas small amounts of nickel from said nickel wire electrode firmly bonded thereto, obtaining a surface characterized by an irregular roughness with a multitude of projections with overhanging edges and minute craters with overhanging edges, and thereafter spraying metal onto the metal surface thusly conditioned.

8. In the method for applying spray metal to a metal surface with a high degree of bond, the improvement which comprises conditioning such metal surface for spray metal bonding by positioning such metal surface and a metal wire electrode in electric circuit with a source of electric energy so as to close said circuit by contact between said metal surface and said wire electrode, repetitiously contact stroking successive areas of said metal surface with said wire electrode under conditions of resistance heating at an average voltage of substantially from one-half to twenty volts to thereby deposit on said areas small amounts of fused metal from said wire electrode firmly bonded to said surface, obtaining a surface characterized by an irregular roughness with a multitude of projections with overhanging edges and minute craters with overhanging edges, and thereafter spraying metal onto the metal surface thusly conditioned.

9. In the method for applying spray metal to a metal surface with a high degree of bond, the improvement in accordance with claim 8 in which said average voltage is substantially from two to nine volts.

10. In the method for applying spray metal to a metal surface with a high degree of bond, the improvement which comprises conditioning such metal surface for spray metal bonding by positioning such metal surface and a nickel wire electrode in electric circuit with a source of electric energy so as to close said circuit by contact between said metal surface and said nickel wire electrode, repetitiously contact stroking successive areas of said metal surface with said nickel wire electrode, under conditions of resistance heating at an average voltage of from two to nine volts to thereby deposit on said areas small amounts of fused nickel from said nickel wire electrode firmly bonded to said metal surface, obtaining a surface characterized by an irregular roughness with a multitude of projections with overhanging edges and minute craters with overhanging edges, and thereafter spraying metal onto the metal surface thusly conditioned.

11. In the method for applying spray metal to a metal surface with a high degree of bond, the improvement which comprises conditioning such metal surface for spray metal bonding by positioning such metal surface and a metal electrode in electric circuit with a source of electric energy so as to close said circuit by contact between said metal surface and said electrode, repetitiously closing and opening said circuit by repetitiously making and breaking contact between said electrode and successive areas of said metal surface, under conditions of current flow in said circuit sufficient to heat and firmly bond fused electrode material on said metal surface upon so closing said circuit, to thereby deposit on said areas small amounts of fused electrode materials firmly bonded thereto, obtaining a surface characterized by an irregular roughness with a multitude of projections with overhanging edges and minute craters with overhanging edges.

JOHN FRANK MEDUNA.

CERTIFICATE OF CORRECTION.

Reissue No. 22,397. November 30, 1943.

JOHN FRANK MEDUNA.

It is hereby certified that error appears in the printed specification of the above numbered patent requiring correction as follows: Page 2, first column, line 11, strike out the words "by step"; page 4, first column, line 17, before "cast" insert the word and comma --brass,--; and second column, line 7, after "this" insert --by--; and that the said Letters Patent should be read with this correction therein that the same may conform to the record of the case in the Patent Office.

Signed and sealed this 21st day of March, A. D. 1944.

Leslie Frazer (Seal) Acting Commissioner of Patents.

roughness with a multitude of projections with overhanging edges and minute craters with overhanging edges, and thereafter spraying metal onto the metal surface thusly conditioned.

11. In the method for applying spray metal to a metal surface with a high degree of bond, the improvement which comprises conditioning such metal surface for spray metal bonding by positioning such metal surface and a metal electrode in electric circuit with a source of electric energy so as to close said circuit by contact between said metal surface and said electrode, repetitiously closing and opening said circuit by repetitiously making and breaking contact between said electrode and successive areas of said metal surface, under conditions of current flow in said circuit sufficient to heat and firmly bond fused electrode material on said metal surface upon so closing said circuit, to thereby deposit on said areas small amounts of fused electrode materials firmly bonded thereto, obtaining a surface characterized by an irregular roughness with a multitude of projections with overhanging edges and minute craters with overhanging edges.

JOHN FRANK MEDUNA.

CERTIFICATE OF CORRECTION.

Reissue No. 22,397. November 30, 1943.

JOHN FRANK MEDUNA.

It is hereby certified that error appears in the printed specification of the above numbered patent requiring correction as follows: Page 2, first column, line 11, strike out the words "by step"; page 4, first column, line 17, before "cast" insert the word and comma --brass,--; and second column, line 7, after "this" insert --by--; and that the said Letters Patent should be read with this correction therein that the same may conform to the record of the case in the Patent Office.

Signed and sealed this 21st day of March, A. D. 1944.

Leslie Frazer (Seal) Acting Commissioner of Patents.